Sept. 8, 1936.   R. J. OTT   2,053,734
STIFFENER PLATE FOR GAS METER SCREWS
Filed Jan. 18, 1934
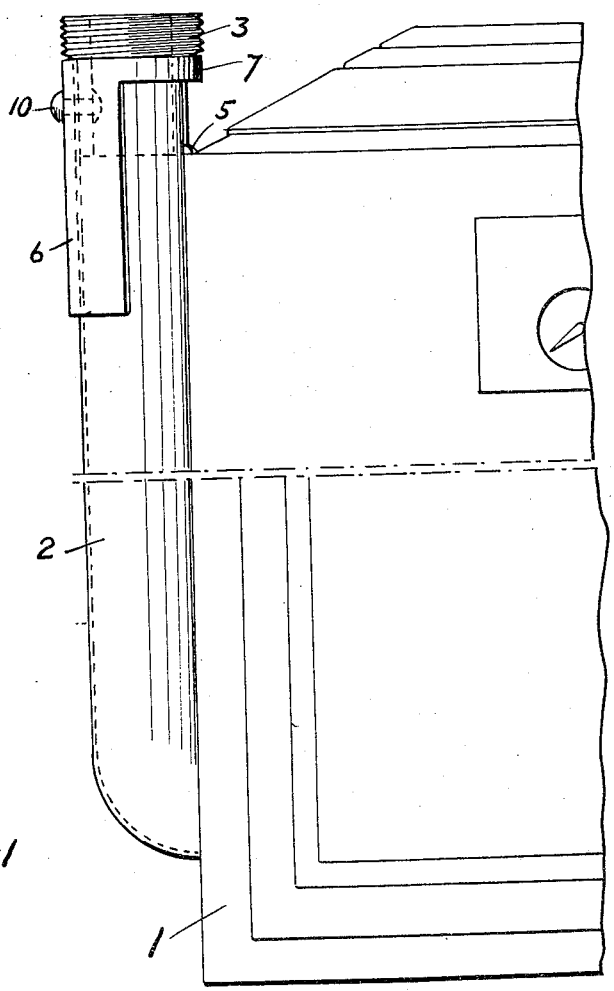
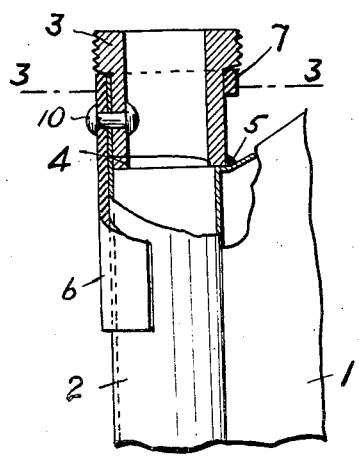
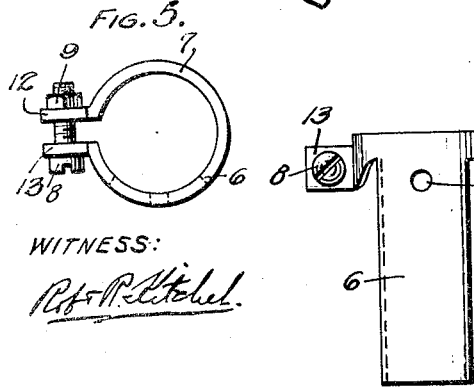
INVENTOR
Robert J. Ott
BY
Augustus B. Stoughton
ATTORNEY.

Patented Sept. 8, 1936

2,053,734

UNITED STATES PATENT OFFICE 2,053,734

STIFFENER PLATE FOR GAS METER SCREWS

Robert J. Ott, Philadelphia, Pa., assignor to The United Gas Improvement Company, Philadelphia, Pa., a corporation of Pennsylvania Application January 18, 1934, Serial No. 707,085

5 Claims. (Cl. 73—272)

The present invention relates to gas meters.

The principal object of the present invention is to provide means for strengthening the joint at the meter screws of the older type of tin case, consumers' meters in order to prevent gas leakage. Such leakage frequently occurs due to failure of the joints between the meter screws and the meter inlet and outlet tubes, occasioned by the application of too great strains in connecting or disconnecting the meter.

The invention can be most advantageously described and its advantages pointed out in connection with the attached drawing which illustrates the apparatus and which form a part of this specification and in which:

Fig. 1 shows a partial front elevation of a tin case, consumers' meter provided with old style, short shank, sweated meter screws, one of which is shown, and provided with a stiffener plate of the present invention;

Fig. 2 shows a partial vertical cross-section of a portion of the apparatus of Fig. 1;

Fig. 3 shows a horizontal cross-section along the line 3—3 in Fig. 2;

Fig. 4 shows an elevation of the stiffener plate not connected; and

Fig. 5 shows a plan view of the stiffener plate of Fig. 4.

Referring to the drawing:

1 generally indicates the meter case which is provided with gas inlet and outlet tubes. Only the inlet tube is shown, being indicated at 2.

The tube is generally U-shaped in cross section, as indicated in Fig. 3, and is soldered to the side of the meter case, projecting above the side as shown in the figures.

The meter screw 3 is sweated into the open end of the tube, the base of the screw shank abutting the top of the case, as indicated at 4, and the joint between the base of the screw shank and the top of the case soldered, as indicated at 5.

The meter outlet tube is not shown in the figures, as it is secured to the other side of the meter similarly to the inlet tube and may be provided with a meter screw in the same manner.

The meter screws serve to connect the meter to the service pipe leading from the gas main and to the house piping leading to the appliances.

The above description is typical of old type, tin case meters which form a large proportion of the consumers' meters now in use. The above-described construction, however, has a decided disadvantage. The sweated joint between the short shank of the screw and the tube and the joint between the screw shank and the top of the case are not of great mechanical strength. In connecting and disconnecting the meter from the house piping, the torsional and bending strains applied to the joints by the fitter's wrenches frequently disrupt the joints and cause leakage of gas. In a large distribution system, thousands of meter leaks per year are due to this cause. These leaks are a source of expense to the distributing company and may be a source of danger to the consumer.

6 generally indicates the stiffener plate of the present invention, which may be made of cold rolled steel, tinned. It is formed with a split collar portion, indicated at 7, provided with fastening means such as the bolt 8 and nut 9. The plate is curved to the curvature of the meter tube, and arranged so that, when the nut is tightened, the collar fits tightly around the tube and meter screw shank, while the depending portion is drawn snugly against the outside of the tube. The plate, tube and meter screw shank are riveted together by the rivet 10, which passes through the hole 11 in the plate and through aligned holes in the tube and screw shank.

The wings 12 and 13 of the collar portion of the plate are offset below the top of the collar to provide clearance for the union connection (not shown) which engages the threads of the screw when the meter is connected.

The stiffener plate has been described in connection with the inlet tube of the meter. Those skilled in the art will understand it is adapted for use in connection with the outlet tube and screw as well.

The device may be manufactured cheaply and readily applied to the old type meters, greatly increasing the strength of the meter screw joints, and greatly reducing their liability to rupture with consequent gas leakage.

Tests of the device have shown that the joint on a five-light meter having the old style, sweated, short shank screw, when provided with a stiffener plate of the above description 2 inches long and made of $\frac{3}{32}''$ cold rolled steel, is approximately 8 times as strong in resistance to gas leakage caused by torsional and bending strains as without the stiffener plate, and approximately 1½ times as strong as the modern flanged and riveted screw joints developed to avoid the leakage troubles of the old type.

The invention has been described in connection with the figures which show a form of the apparatus of the invention chosen for illustration. Those skilled in the art to which it applies will readily understand that the apparatus may be considerably modified and still fall within the spirit of the invention, which is only limited as the prior art and the appended claims may require.

I claim:

1. A gas meter device comprising a gas meter having a meter tube therein, a meter screw connected to said tube, a stiffener plate having a split collar portion surrounding a portion of said tube and said screw, a curved wall forming a part of said stiffener plate and depending from said split collar portion along said tube, and means for clamping said split collar portion about said portion of said tube and said screw.

2. A gas meter device comprising a gas meter having a meter tube therein, a meter screw connected to said tube, a stiffener plate, means for clamping said stiffener plate about a portion of said tube and said screw, and second means for attaching said stiffener plate to said tube and to said screw.

3. A stiffener plate for a gas meter screw comprising a split collar portion, means for clamping said split collar portion, and a curved wall extending from said split collar portion, said curved wall comprising a portion of a cylinder.

4. A stiffener plate for gas meter screws comprising a split collar portion, means for connecting and moving the ends of said split collar portion, a curved wall extending from said split collar portion, said curved wall comprising a portion of a cylinder, and means in said curved wall for receiving a fastening means therein.

5. A gas meter device comprising, a gas meter having a meter tube therein, a meter screw connected to said meter tube, a stiffener plate having a split collar portion surrounding a portion of said tube and said screw, a curved wall forming a part of said stiffener plate and depending from said split collar portion along said tube, a bolt and co-operating nut for clamping said split collar portion about a portion of said tube and said screw, and a rivet passing through and connecting said meter screw and said stiffener and said meter tube together.

ROBERT J. OTT.